Patented Aug. 7, 1951

2,562,994

UNITED STATES PATENT OFFICE 2,562,994

METHOD FOR PREPARING FLUOROTHIOPHENE

Robert T. Van Vleck, Fishkill, N. Y., assignor to The Texas Company, New York, N. Y., a corporation of Delaware No Drawing. Application May 27, 1948, Serial No. 29,641

3 Claims. (Cl. 260—332.5)

This invention relates to the preparation of monofluorothiophene and derivatives thereof and in particular 2-fluorothiophene. Moreover, this invention discloses a novel and highly selective method of preparing fluorothiophenes.

2-fluorothiophene, a novel compound, is a water-white liquid having a boiling point of 82° C. at atmospheric pressure. Fluorothiophenes and 2-fluorothiophene in particular have utility as insecticides, bactericides, fungicides and as intermediates in the preparation of insecticides, fungicides and bactericides.

Fluorothiophenes are prepared by reacting iodothiophenes with antimony trifluoride in the presence of nitromethane as a solvent. Under the conditions employed by applicant, fluorothiophene resulted from reaction of antimony trifluoride with iodothiophene, but was not obtained by the reaction of antimony trifluoride with other thiophene halides. Moreover, the reaction between iodothiophene and antimony trifluoride is highly specific as to solvent; 2-fluorothiophene resulted when the reaction between iodothiophene and antimony trifluoride was effected in nitromethane but was not obtained when the reaction was attempted in nitroethane, nitropropane and tertiary-butylthiophene.

The preparation of 2-fluorothiophene is illustrated by the following example. As has been indicated, the mode of preparation is specific both in the halo-thiophene reactant and in the solvent that may be employed. However, the mode of preparation is not to be construed as a limitation upon the novel compound of this invention.

150 grams of 2-iodothiophene, 55 grams of antimony trifluoride, SbF$_3$, and 290 grams of nitromethane were heated under reflux for a period of 9.5 hours at a temperature of 110° C. The total reaction product was subjected to distillation whereby fluorothiophene and solvent were obtained as a distillate. The distillate was washed with thiosulfate solution in order to free it from iodine and the organic layer from the washing was separated and dried over calcium chloride. Upon redistillation, 10.5 grams of 2-fluorothiophene were obtained; this amounted to a yield of about 14.5 mol per cent. The following equation illustrates the mode of preparation and the structural formula of the novel compound of this invention:

2-fluorothiophene obtained in this example has a boiling point of 82° C. at atmospheric pressure and has a refractive index of 1.4971 at 20° C. Quantitative analysis of 2-fluorothiophene for sulfur and fluorine showed it to contain 31.45 per cent sulfur and 18.0 per cent fluorine, as contrasted with calculated theoretical values of 31.37 per cent and 18.6 per cent respectively.

Obviously, many modifications and variations of the invention, as hereinbefore set forth, may be made without departing from the spirit and scope thereof and, therefore, only such limitations should be imposed as are indicated in the appended claims.

I claim:

1. A method for preparing fluorothiophenes which comprises reacting iodothiophenes with antimony trifluoride in the liquid phase in the presence of nitromethane as a solvent.

2. A method for preparing mono-fluorothiophenes which comprises reacting mono-iodothiophene with antimony trifluoride in the liquid phase in the presence of nitromethane as a solvent.

3. A method for preparing mono-fluorothiophenes which comprises reacting mono-iodothiophene with antimony trifluoride in the liquid phase in the presence of nitromethane as a solvent at reflux temperature.

ROBERT T. VAN VLECK.

REFERENCES CITED

The following references are of record in the file of this patent:

Whitmore: Organic Chemistry, pp. 884, 893, Van Nostrand, New York, 1937.

Steinkopf: Die Chemie des Thiophens, pp. 35, 42, Edwards Lithoprint, Ann Arbor, 1941.

Mee, Richter's Organic Chemistry, vol. 3, page 50, Elsevier, New York, 1946.